United States Patent [19]

Takahashi

[11] Patent Number: 5,570,307

[45] Date of Patent: Oct. 29, 1996

[54] DIGITAL RANDOMIZER FOR ON-CHIP GENERATION AND STORAGE OF RANDOM SELF-PROGRAMMING DATA BLOCK

[75] Inventor: Richard J. Takahashi, Phoenix, Ariz.

[73] Assignee: VLSI Technology, Inc., San Jose, Calif.

[21] Appl. No.: 369,616

[22] Filed: Jan. 6, 1995

[51] Int. Cl.⁶ .............................. G06F 1/02; H04L 9/00; H03B 29/00

[52] U.S. Cl. .............................. 364/717; 380/46; 331/78

[58] Field of Search .............................. 364/717; 380/46; 331/78

[56] References Cited

U.S. PATENT DOCUMENTS

| | | | |
|---|---|---|---|
| 4,769,777 | 9/1988 | Bittle et al. | 364/717 |
| 4,799,259 | 1/1989 | Ogrodski | 364/717 |
| 4,810,975 | 3/1989 | Dias | 364/717 |
| 4,905,176 | 2/1990 | Schulz | 364/717 |

*Primary Examiner*—Tan V. Mai
*Attorney, Agent, or Firm*—Flehr, Hohbach, Test, Albritton & Herbert

[57] ABSTRACT

A purely digital randomizer system generates an undeterministic data block using standard cell library units and includes a random number generator. The generator preferably includes at least two metastable blocks that each include a plurality of D-type flip-flops. Each flip-flop is coupled to a dedicated free-running oscillator whose frequency is based on a relative prime number for each frequency leg. Each of the D-type flip-flops is also coupled to receive a common jitter clock signal. The flip-flops are thus forcibly operated in a metastable state by intentionally violating the flip-flop set-up or hold time margins of incoming data relative to the jitter clock. To further maximize entropy, the flip-flop outputs are exclusively 'OR'd ("EX-OR'd") and then passed through first and second shift registers of uneven and preferably even and odd bit lengths. Preferably each shift register includes at least one metastably-operated D-type flip-flop, to further promote randomness. The shift register outputs are combined in an EX-OR tree are cross-fed back to the EX-ORs at the shift register inputs. The input from each shift register is then EX-OR'd and clocked out with a system clock to provide first and second channels of undeterministic data.

29 Claims, 3 Drawing Sheets

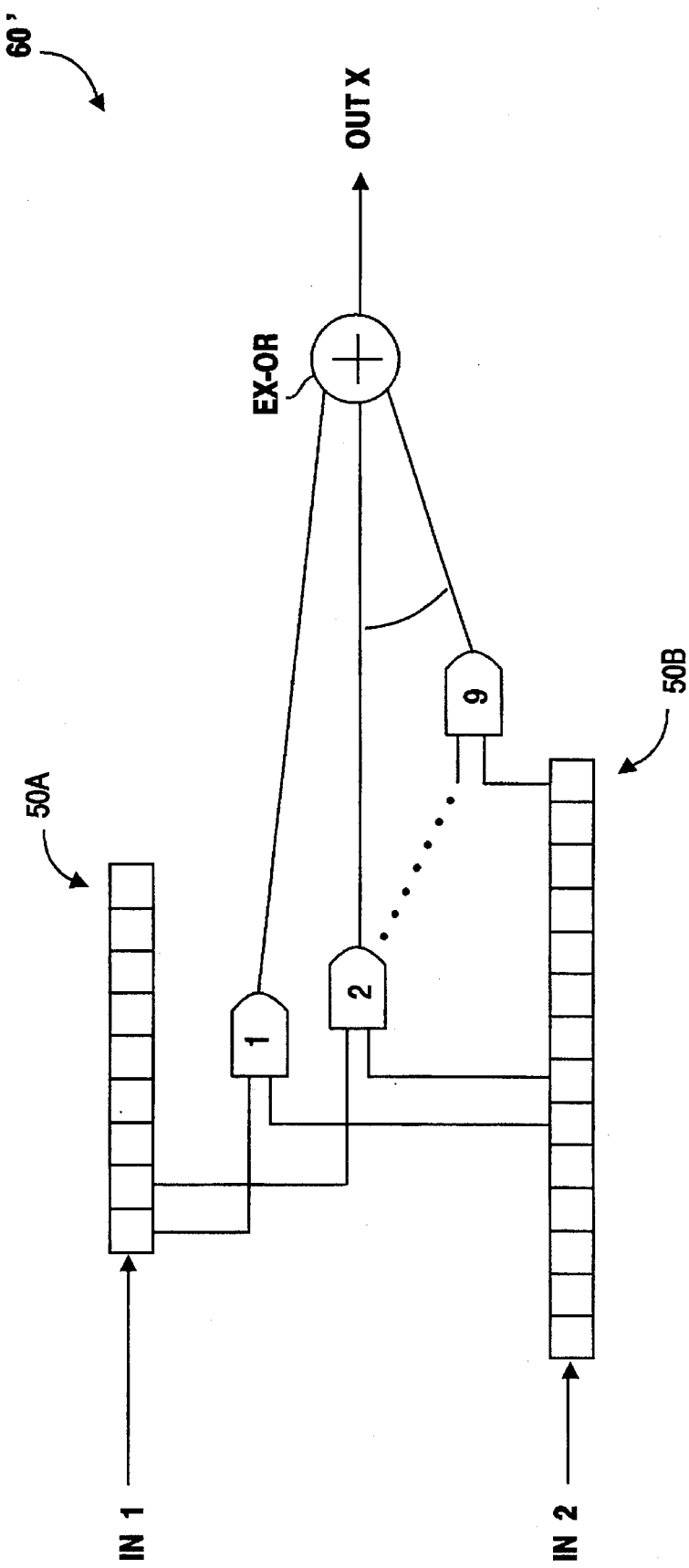

DIGITAL RANDOMIZER FOR ON-CHIP GENERATION AND STORAGE OF RANDOM SELF-PROGRAMMING DATA BLOCK

FIELD OF THE INVENTION

The invention relates generally to generating random numbers, and more specifically to generating random numbers using digital circuitry.

BACKGROUND OF THE INVENTION

It is known in the art to use digital circuits such as pseudo random number ("PRN") generators, and linear feed-back linear shift register ("LSFR") generators to provide what are hopefully pseudo random numbers. For example, if an LSFR circuit is 200 bits in length, theoretically the output data block pattern should not repeat itself more than once in $2^{200}$ bits, which is indeed random. Unfortunately, generating true random numbers is difficult in practice, and can require an excessive number of components and operating power.

To further enhance security, in many applications it would be desirable to digitally generate a random number (or data block), which is then stored in non-volatile memory. Preferably a single integrated circuit ("IC") chip would contain the random number generator, the non-volatile memory, and perhaps other system circuitry as well.

Depending upon the task at hand, the random number may or may not be allowed to be read-out of the memory. However the nature and complexity of prior art approaches required to implement such on-chip security is prohibitive. Further, production testing of such ICs for randomness is prohibitive.

On-chip generation and storage of a truly undeterministic (e.g., random) data block would also permit IC manufacturer to encode a unique identification for each IC, which number may be used for securing access to the IC chip and/or memory. So doing would make unauthorized cloning of the IC difficult in that the utility of the undeterministic data block would not be known to the person cloning, and the cost required to attempt to learn the utility and unique key identity would be prohibitive relative to the cost of the IC. Again, however, it is not economically feasible to implement such on-chip protection using prior art approaches.

Non-volatile memory components are commonly used in many digital circuit applications, including systems in which an integrated circuit ("IC") containing at least a part of the memory retains a unique identification number used for securing access to the system and/or memory.

In such communication systems, it is known to permanently store an identification number with the non-volatile memory such that persons seeking to access other information stored in the memory must first properly replicate the identification number. In a so-called public-key encryption system, for example, the data block, or sequence of digital bits that define the private deciphering key, must be maintained in secrecy to preserve integrity of the system. One method of preserving secrecy of such keys is to generate the key randomly, and then store the key in non-volatile memory. A preferably random so-called seed (or initialization vector) routine, that need not be kept secret due to its undeterministic nature, produces a random bit stream in cryptographic applications.

What is needed is a system for digitally generating an undeterministic data block that may be stored in a non-volatile memory on an IC preferably also containing the system. Such a system should also permit self-testing. The present invention provides such a system.

SUMMARY OF THE INVENTION

An on-chip system for generating an undeterministic data block includes a purely digital randomizer that may be implemented from standard cell library units that are independent of the fabrication technology used.

A randomizer according to the present invention includes a random number generator that, for reasons of robustness, preferably includes at least two metastable blocks. Each metastable block includes a plurality of D-type flip-flops, defining frequency legs, whose outputs are forced to be unpredictable by operating the flip-flops in a metastable state. Each flip-flop is coupled to a dedicated free-running oscillator whose frequency is based on a relative prime number for each frequency leg. Each of the D-type flip-flops is also coupled to receive a common jitter clock signal. The flip-flops are caused to operate in a metastable state by intentionally violating either the flip-flop set-up or hold time margins of incoming data relative to the jitter clock. The random or unpredictable nature of the flip-flops operated in the metastable state is a primary source of the generated undeterministic data blocks.

To further maximize entropy, the flip-flop outputs are exclusively 'OR'd ("XOR'd") and then passed through first and second shift registers of uneven bit lengths, preferably even and odd bit lengths. Preferably each shift register includes at least one metastably-operated D-type flip-flop, to further promote randomness. The shift register outputs are combined in an exclusive OR tree ("EX-OR TEE") and are cross-fed back to the EX-ORs at the input of the shift registers. The input from each shift register is then XOR'd and clocked out with a system clock to provide first and second channels of undeterministic data. Of course, a single channel of data could instead be generated. Thus, randomness does not rely solely upon metastable state flip-flop operation, but also upon the use of the free-running oscillators and entropy-expanding EX-OR tree logic.

Other features and advantages of the invention will appear from the following description in which the preferred embodiments have been set forth in detail, in conjunction with the accompanying drawings.

BRIEF DESCRIPTION OF THE DRAWINGS

FIG. 3 depicts a portion of an exclusive-OR tree, according to the present invention.

DETAILED DESCRIPTION OF THE PREFERRED EMBODIMENT

Figure 1:
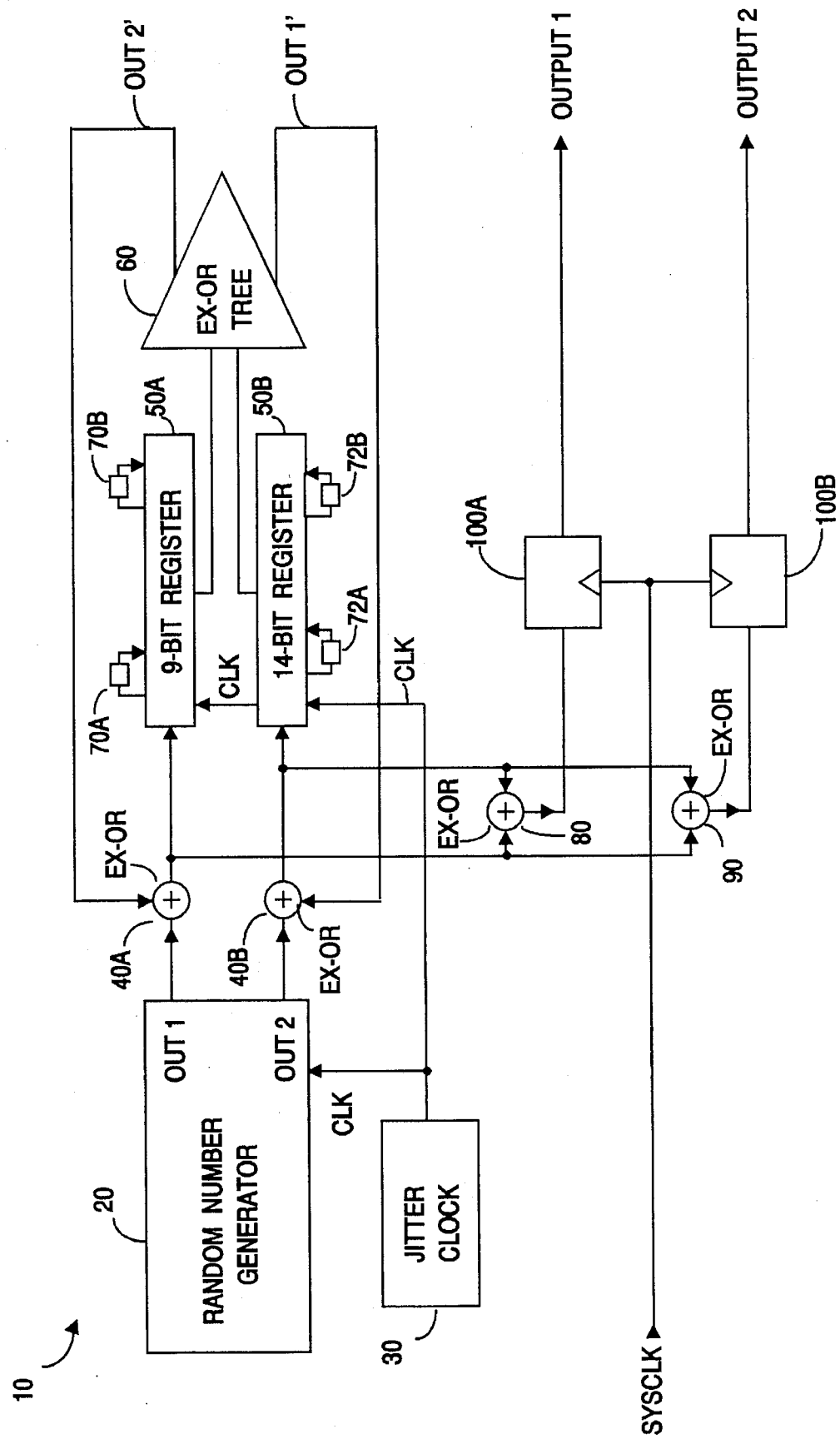
FIG. 1 is a block diagram of a digital randomizer, according to the present invention.

FIG. 1 depicts a system 10 that may be fabricated on a single integrated circuit ("IC") chip to generate undeterministic (or non-deterministic, or random) data block output signals. In the preferred embodiment, for reasons of reliability, fault tolerance and robustness, two independent channels of random data are generated, denoted OUTPUT 1 and OUTPUT 2. Suitable architecture for such an on-chip system is disclosed in applicant's U.S. patent application, filed simultaneously with the present application and assigned to a common assignee, entitled ON-CHIP RANDOMLY SELF-PROGRAMMABLE NON-VOLATILE MEMORY ARCHITECTURE.

In FIG. 1, system 10 includes a random number generator (to be described in greater detail with respect to FIG. 2) that receives a clock (CLK) signal from a jitter clock 30, and outputs two undeterministic data signals, denoted OUT 1 and OUT 2. The OUT 1 and OUT 2 signals are input to first and second intermediate EX-OR units, 40A, 40B, which units also receive as input outputs from an exclusive OR ("EX-OR") tree 60. As will be described, the EX-OR tree outputs (denoted OUT 1', OUT 2') are cross-fed back to intermediate EX-OR units 40A, 40B.

The outputs from EX-OR units 40A and 40B are coupled as respective inputs to first and second shift registers 50A, 50B, the registers being M-bit and N-bit in length. The respective outputs from the registers are input to EX-OR tree 60 for entropy spreading. Registers 50A, 50B expand the random stream from the random number generator 20. To minimize any possible correlation effects, registers 50A, 50B are preferably of odd and even numbered bit-lengths, as odd or even numbered bit-lengths will always offset one another. Applicant's experiments have suggested that at least a 9-bit register length appears sufficiently long to promote randomness, and that making the bit lengths of the two registers different by perhaps five bits further promotes randomness. Of course registers of different bit lengths could be used, and indeed if less randomness is acceptable, registers 50A and 50B might be dispensed with.

To increase the so-called flatness of the random stream, delay elements (e.g., 70A, 72A, 70B, 72B) preferably are inserted in series with bit positions in each register. Each delay element includes a pair of metastable D-type flip-flops, with a gate delay inserted in series with the common jitter clock (CLK) line between the flip-flops. The nominal gate delay is made equal in time to the flip-flop D-to-Q delay. This ensures that data from an the adjacent flip-flop will routinely violate the set-up and hold times of the following flip-flop. Preferably the delaying gate has unequal output rise and fall times, e.g., a generic NOR gate.

In the preferred embodiment, for the 9-bit register 50A, delay units such as 70A were inserted between bit register positions 3 and 4, and between bit register positions 7 and 8. For the 14-bit register 50B, three delay units, e.g., 70B, were inserted between bit register positions 1 and 2, between bit register positions 5 and 6, and between bit register positions 10 and 11. Of course, a different number of delay units could be inserted in the register stream, could be inserted elsewhere within the register stream, or in fact could be dispensed with, at the risk of decreased randomness or entropy. As shown in FIG. 1, the outputs from registers 50A, 50B are coupled as input to EX-OR tree 60, whose outputs OUT 1l, OUT 2' are fedback to the EX-OR gates 40A, 40B in so-called cross-strap fashion.

As noted, the input EX-OR gates 40A, 40B have two inputs: OUT 1, OUT 2 from the random number generator 20, and the feedback signals OUT 2' OUT 1' from the EX-OR tree 60 The OUT 1' signal represents the stream resulting from OUT 1 from the random number generator 20, whereas the OUT 2' signal represents the stream resulting from OUT2. This configuration allows system 10 to better tolerate single point failures without compromising the integrity of the random stream. The primary source of the random noise or data stream is the random number generator 20, with shift registers 50A, 50B acting as a secondary source.

The jitter clock 30 generates a phase noise clock (or jitter) CLK signal for the random number generator 20, and for registers 50A, 50B to promote clock edge uncertainty. As such, jitter clock 30 ensures that D-type flip-flops in system 10 will randomly upset oscillator re-clocking within random number generator 20 (see FIG. 2). Preferably jitter clock 30 is a digital mixer or rate multiplier. The D-input of the digital mixer receives a first oscillator frequency F1 while the clock input to the digital mixer receives a higher frequency F2. The Q-port of the digital mixer will output a signal of frequency F2-F1. In the preferred embodiment, F1=1 MHz, F2=2 MHz, and the digital mixer output signal was 1 MHz with jitter being produced whenever the F1 and F2 signals phase shifted relative to each other. Of course, other circuits may instead be used to provide a jitter clock source. Alternatively, jitter clock 30 may be implemented using a counter, e.g., a 7-bit counter, that is re-phased on odd cycles, and by re-loading the counter again on odd cycles.

It will be appreciated that use of a jitter clock in the present invention is in apposite to conventional digital circuit design wherein considerable effort is made to minimize clock edge uncertainty, and any resultant metastable operation of flip-flips.

As further shown in FIG. 1, the outputs from EX-OR gates 40A, 40B are re-clocked with the system clock signal (SYSCLK) using redundant D-type flip flops 100A, 100B. The output from these flip-flops represents two independent channels of undeterministic data. It will be appreciated that should a single point failure cause one channel of output data to fail, the remaining channel will still be present.

Figure 2:
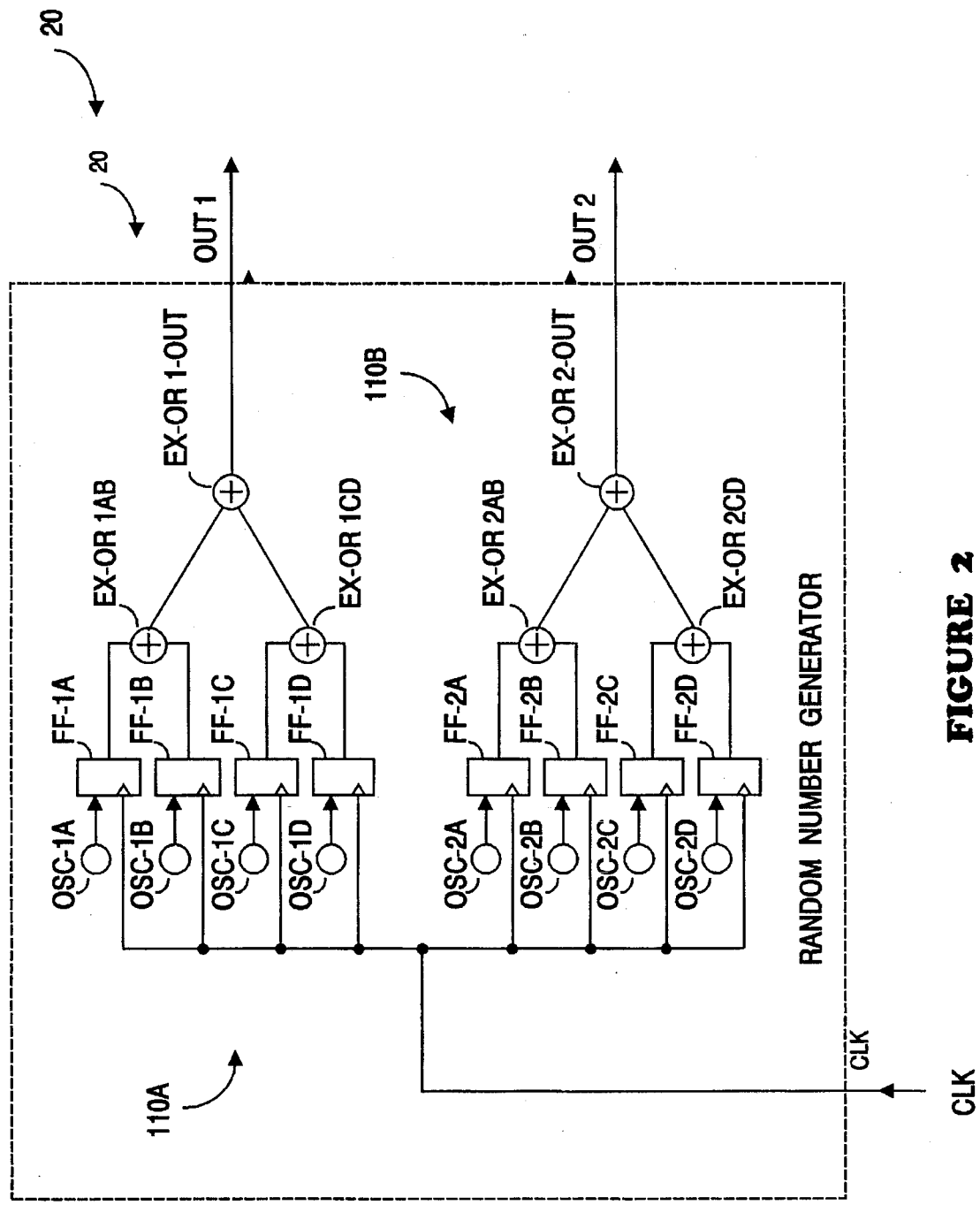
FIG. 2 is a detailed block diagram of a dual-channel random number generator, according to the present invention.

FIG. 2 depicts the dual-channel random number generator 20 in further detail. Generator 20 preferably includes two metastable blocks 110A, 110B. Using block 110A as an example, each block contains a plurality of D-type flip-flops, e.g., FF-1A, FF-1B, FF-1C, FF-1D. Of course a different number of D-type flip-flops could be used in each block, with no requirement that the number be equal or even that the number be even. The clock input to each of the flip-flops is coupled to receive the CLK signal generated by jitter clock 30. The D-input to each flip-flop is coupled to a separate free-running oscillator. Thus FF-1A is coupled to oscillator OSC-1A, FF-1B to oscillator OSC-1B, and so on. As used herein, each flip-flop and its associated unique oscillator define a frequency leg.

In the present invention, the various free-running oscillators are asynchronous to the jitter clock CLK signal. This configuration ensures that the set-up and hold-times of the D-type flip-flops (e.g., FF-1A, FF-1B) will be violated, thus starting the generation of a random noise sequence. These flip-flops function in the same manner as the digital mixer described earlier with respect to jitter clock 30.

The frequency of each oscillator is selected based upon a relative prime number to each frequency leg. In the preferred embodiment, metastable block 110 used the following frequencies: leg 1 (OSC-1A): 29 Mhz, leg 2 (OSC-1B): 5 Mhz, leg 3: (OSC-1C) 73 Mhz, and leg 4 (OSC-1D): 3 Mhz. Block 110B used the following frequencies: leg 1 (OSC-2A): 7 Mhz, leg 2 (OSC-2B): 11 Mhz, leg 3 (OSC-2C): 97 Mhz, and leg 4 (OSC-2D): 37 Mhz. Of course, other prime frequency combinations may be used.

Preferably each oscillator is implemented using a complementary metal oxide semiconductor ("CMOS") NAND gate, and a nominal frequency-determining resistor/capacitor. The prime frequency for each leg is set at the nominal condition of the CMOS process, and in practice may range from sub-KHz to perhaps 711 MHz. Understandably, higher frequencies will require more operating power, due to capacitive loadings.

As shown in FIG. 2, the outputs from flip-flop pairs are EX-OR'd together, e.g., using flip-flop combining gates EX-OR 1AB, EX-OR 1CD, and the outputs from these EX-OR gates are EX-OR'd together, e.g., using a flip-flop output gate EX-OR 1-OUT to yield a single output, e.g., OUT 1. It is understood that if an odd number of flip-flops is present, the output from the remaining flip-flop may be exclusively-OR'd with EX-OR 1AB or EX-OR 1CD (in which case the combining exclusive-OR gate would have a third input). Alternatively, an additional exclusive-OR gate may be provided whose inputs are the OUT 1 (or OUT 2) signal shown in FIG. 2, and the output from the remaining flip-flop. The output signal from this additional exclusive-OR gate would then be OUT 1 (or OUT 2).

Although design of random number generator 20 is independent of the type of D flip-flop used, the use of D-type flip-flops designed especially to eliminate synchronous failures must be avoided. By contrast, the present invention intentionally utilizes flip-flops that will exhibit synchronous failures, and resultant desired metastable state of operation such that flip-flop toggling occurs in an unpredictable manner.

FIG. 3 depicts an EX-OR tree, such as tree 60 in FIG. 1. For ease of reference, the inputs to the registers 50A, 50B are denoted, respectively, IN 1 and IN 2, and the output of the tree portion shown is denoted OUT X. Tree 60 may be implemented using standard EX-OR and AND gates (e.g., AND gates 1, 2, ... 9). Connection between the input of tree 60 and the outputs of registers 50A, 50B preferably is in an odd numbering of 9 to help maximize entropy. As noted, tree 60 provides dual independent output signals, OUT 1' OUT 2' that are cross-coupled back to the EX-OR gates 40A, 40B at the register inputs.

The output of the EX-OR gates is a function of the connected AND gates, whose number (e.g., 1, 2, ... ) indicates the connection to the EX-OR gate. The outputs OUT 1' and OUT 2' are EX-OR'd as follows:

OUT 1'=[AND1,AND3, AND5, AND7, AND9]

OUT 2'=[AND1,AND2,AND3,AND7,AND8, AND9]

Preferably randomizer system 10 includes testability features permitting continuity checks and verification of the integrity of the design using multiplex control. As described, system 10 will indeed generate undeterministic data providing that flip-flop toggling and gate switching occur. Thus, it suffices for testing to ensure that each leg of the randomizer may be accessed to detect toggling (e.g., a non-stuck condition), and to verify a non-stuck condition of the various EX-OR gates. Such testing may be facilitated using multiplexer switches coupled to signal nodes of interest. This ease of testing is in stark contrast to prior art systems in which a non-stuck condition does not mean that the signals being generated are random.

It will be appreciated that the present invention may be used as a peripheral for a microprocessor, e.g., as a random number generator, or may be used as a stand-alone device. Further, the architecture disclosed is substantially independent of the technology used to implement the units comprising the invention: the flip-flops, the registers, the logic gates. As noted, all of these components may advantageously be found in standard cell libraries. Modifications and variations may be made to the disclosed embodiments without departing from the subject and spirit of the invention as defined by the following claims.

What is claimed is:

1. A system for generating an undeterministic data signal, comprising:

a plurality of N1 D-type flip-flops, each flip-flop including:
  a clock input port coupled to a common jitter clock signal;
  a delay input port coupled to receive a dedicated free-running oscillator signal; and
  an output port;

a jitter clock, outputting a phase noise signal causing said flip-flops to operate metastably;

N1 free-running oscillators, each oscillator oscillating at a frequency that is a prime number relative to a frequency of oscillation of each other of said oscillators, each oscillator having an output port coupled to a said delay input port of one of said flip-flops; and exclusive-OR means for outputting the undeterministic data signal, said exclusive-OR means coupled to receive an output signal from each said D-type flip-flop;

wherein N1 is an integer.

2. The system of claim 1, wherein said exclusive-OR means includes:

for each pair of said D-type flip-flops, a flip-flop combining exclusive-OR gate having first and second input ports coupled to receive an output signal from each said output port of the pair of said D-type flip-flops, said flip-flop combining exclusive-OR gate further having an output port;

for each flip-flop combining exclusive-OR gate pair, an output exclusive-OR gate having two input ports, each of which input ports is coupled to an output port of a said flip-flop combining exclusive-OR gate comprising the pair, said flip-flop combining exclusive-OR gate further having an output port;

for any odd-numbered D-type flip-flop not included in a D-type flip-flop pair, a chosen one of (a) an exclusive-OR gate receiving as a first input an output signal from any said odd-numbered D-type flip-flop, and receiving as a second input a signal from said output port of said flip-flop combining exclusive-OR gate, and providing as an output said undeterministic data signal; and (b) wherein at least one said flip-flop combining exclusive-OR gate includes a third input coupled to receive an output signal from any said odd-numbered D-type flip-flop, wherein an undeterministic data signal is present at said output port of said output exclusive-OR gate.

3. The system of claim 1, further including a shift register having a delay element coupled in series between adjacent bit positions in said shift register;

said shift register having an input port coupled to said output port of said output exclusive-OR gate, having a clock port coupled to receive said jitter clock signal, and having an output port;

wherein an undeterministic data signal is present at said output port of said shift register, which data signal has increased entropy relative to said undeterministic data signal present at said output port of said output exclusive-OR gate.

4. The system of claim 3, wherein said shift register includes M bit positions, each of said positions being defined by a D-type flip-flop having a said clock port, a flip-flop D input port, and a Q output port;

wherein said delay element includes a logic gate whose delay is substantially equal in time to a D-to-Q delay of a said D-type flip-flop in said register.

5. The system of claim 1, wherein said jitter clock includes a digital mixer having first and second input ports coupled to receive respective first and second signals having respective first and second frequencies;

said digital mixer having an output port providing a phase signal of frequency equal to a frequency difference between said first and second frequencies.

6. The system of claim 1, wherein said jitter clock outputs a phase noise signal that violates a chosen one of set-up time margin and hold time margin for said flip-flops to cause said flip-flops to operate metastably.

7. A system for generating first and second channels of undeterministic data signals, comprising:

a first plurality of N1 D-type flip-flops, each flip-flop including:
a clock input port coupled to a common jitter clock signal;
a delay input port coupled to receive a dedicated free-running oscillator signal; and
an output port;

a second plurality of N2 D-type flip-flops, each flip-flop including:
a clock input port coupled to a common jitter clock signal;
a delay input port coupled to receive a dedicated free-running oscillator signal; and
an output port;

a jitter clock, outputting a phase noise signal causing said flip-flops to operate metastably;

N1 free-running oscillators, each oscillator oscillating at a frequency that is a prime number relative to a frequency of oscillation of each other of said oscillators, each oscillator having an output port coupled to a said delay input of one of said flip-flops comprising said first plurality N1 of D-type flip-flops;

N2 free-running oscillators, each oscillator oscillating at a frequency that is a prime number relative to a frequency of oscillation of each other of said oscillators in said system, each oscillator having an output port coupled to a said delay input of one of said flip-flops comprising said second plurality of N2 D-type flip-flops;

first exclusive-OR means for outputting a first channel of undeterministic data, said first exclusive-OR means coupled to receive an output signal from each said D-type flip-flop in said first plurality of N1 D-type flip-flops;

second exclusive-OR means for outputting a second channel of undeterministic data, said second exclusive-OR means coupled to receive an output signal from each said D-type flip-flop in said second plurality of N2 D-type flip-flops;

an M-bit shift register having an input port coupled to an output port of said first exclusive-OR means, having a clock port coupled to receive said jitter clock signal, and having an output port;

an N-bit shift register having an input port coupled to an output port of said second exclusive-OR means, having a clock port coupled to receive said jitter clock signal, and having an output port;

wherein N1 and N2 are integers, and wherein first and second channels of undeterministic data signal are provided at said output port of said M-bit shift register and said N-bit shift register.

8. The system of claim 7, wherein:

said first exclusive-OR means includes, for each pair of said D-type flip-flops in said first plurality of N1 D-type flip-flops, a first flip-flop combining exclusive-OR gate having first and second input ports coupled to receive an output signal from each said output port of the pair of said D-type flip-flops, and having an output port;

said second exclusive-OR means includes, for each pair of said D-type flip-flops in said second plurality of N2 D-type flip-flops, a second flip-flop combining exclusive-OR gate having first and second input ports coupled to receive an output signal from each said output port of the pair of said D-type flip-flops, and having an output port;

for each first flip-flop combining exclusive-OR gate pair, a first output exclusive-OR gate having two input ports, each of which input ports is coupled to an output port of a said flip-flop output exclusive-OR gate comprising the pair, said first output exclusive-OR gate further having an output port;

wherein a first channel of undeterministic data signal is present at said output port of said first output exclusive-OR gate;

for each second flip-flop combining exclusive-OR gate pair, a second output exclusive-OR gate having two input ports, each of which input ports is coupled to an output port of a said flip-flop output exclusive-OR gate comprising the pair, said second output exclusive-OR gate further having an output port;

for any odd-numbered D-type flip-flop not included in a D-type flip-flop pair, a chosen one of (a) an exclusive-OR gate receiving as a first input an output signal from any said odd-numbered D-type flip-flop, and receiving as a second input a signal from said output port of a said flip-flop combining exclusive-OR gate, and providing as an output said undeterministic data signal; and (b) wherein at least one said flip-flop combining exclusive-OR gate includes a third input coupled to receive an output signal from any said odd-numbered D-type flip-flop, wherein an undeterministic data signal is present at said output port of said output exclusive-OR gate;

wherein a second channel of undeterministic data signal is present at said output port of said second output exclusive-OR gate;

said M-bit shift register has said input port coupled to said output port of said first output exclusive-OR gate; and said N-bit shift register has said input port coupled to said output port of said second output exclusive-OR gate.

9. The system of claim 7, wherein:

each said shift register includes bit positions defined by a D-type flip-flop having a said clock port, a flip-flop D input port, and a Q output port;

at least one of said M-bit and said N-bit shift registers includes a delay element coupled in series between adjacent bit positions in said shift register;

said delay element including a logic gate whose delay is substantially equal in time to a D-to-Q delay of a said D-type flip-flop in said register.

10. The system of claim 7, wherein M and N are numbers having a characteristic selected from the group consisting of (a) M and N are unequal, (b) M is even and N is odd, (c) the smaller of M and N exceeds 9, and (d) the difference between M and N exceeds 5.

11. The system of claim 7, further including an exclusive-OR tree coupled to receive as inputs said first and second channels of undeterministic data signal output by said M-bit shift register and said N-bit shift register;

said exclusive-OR tree providing a first and second intermediate output channels of data in response to said first and said second channel of undeterministic data signal from said output port of said first and said second output exclusive-OR gate, respectively;

a first intermediate exclusive-OR gate coupled in series between said first output exclusive-OR gate and said M-bit shift register;

said first intermediate exclusive-OR gate having a first input pert coupled to receive said first channel of undeterministic data from said output port of said first output exclusive-OR gate, having a second input port coupled to receive the second intermediate channel of data from said exclusive-OR tree, and having an output port coupled to said input of said M-bit shift register;

a second intermediate exclusive-OR gate coupled in series between said second output exclusive-OR gate and said N-bit shift register;

said second intermediate exclusive-OR gate having a first input port coupled to receive said second channel of undeterministic data from said output port of said second output exclusive-OR gate, having a second input port coupled to receive the first intermediate channel of data from said exclusive-OR tree, and having an output port coupled to said input of said N-bit shift register;

wherein independent first and second channels of undeterministic data are output by the first and second intermediate exclusive-OR gates.

12. The system of claim 11, further including:

third and fourth exclusive-OR gates, each having a first input port coupled to said input port of said M-bit shift register, each having a second input port coupled to said input port of said N-bit shift register, and each having an output port;

first and second output D-type flip-flops, each having a D-input port, an output port, and a system clock input port coupled to receive a common system clock signal that is asynchronous relative to said jitter clock signal;

said output port of the third exclusive-OR gate being coupled to said D-input port of said first output D-type flip-flop;

said output port of the fourth exclusive-OR gate being coupled to a D-input of said second output D-type flip-flop;

wherein first and second independent channels of undeterministic data having increased entropy are present at the output port of said first and said second output D-type flip-flop.

13. The system of claim 6, wherein said jitter clock includes a digital mixer having first and second input ports coupled to receive respective first and second signals having respective first and second frequencies;

said digital mixer having an output port providing a phase signal of frequency equal to a frequency difference between said first and second frequencies.

14. The system of claim 7, wherein said jitter clock outputs a phase noise signal that violates a chosen one of set-up time margin and hold time margin for said flip-flops to cause said flip-flops to operate metastably.

15. The system of claim 7, wherein $N1 \geq N2$.

16. The system of claim 7, wherein at least one integer of said N1 and N2 has a characteristic selected from the group consisting of (i) said integer is even, and (ii) said integer is odd.

17. A method for generating an undeterministic data signal, the method including the following steps:

(a) providing a plurality of N1 D-type flip-flops, each flip-flop including:
   a clock input port coupled to a common jitter clock signal, where N1 is an integer;
   a delay input port coupled to receive a dedicated free-running oscillator signal; and
   an output port;

(b) providing a jitter clock, outputting a phase noise signal causing said flip-flops to operate metastably;

(c) providing N1 free-running oscillators, each oscillator oscillating at a frequency that is a prime number relative to a frequency of oscillation of each other of said oscillators, each oscillator having an output port coupled to a said delay input port of one of said flip-flops;

(d) providing exclusive-OR means for outputting the undeterministic data signal, wherein said exclusive-OR means is coupled to receive an output signal from each said D-type flip-flop.

18. The method of claim 17, including an additional step of providing a shift register having a delay element coupled in series between adjacent bit positions in said shift register;

said shift register having an input port coupled to an output port of said exclusive-OR means, having a clock port coupled to receive said jitter clock signal, and having an output port;

wherein an undeterministic data signal is present at said output port of said shift register, which data signal has increased entropy relative to said undeterministic data signal present at said output port of said exclusive-OR means.

19. The method of claim 18, wherein said shift register includes M bit positions, each of said positions being defined by a D-type flip-flop having a said clock port, a flip-flop D input port, and a Q output port;

wherein said delay element includes a logic gate whose delay is substantially equal in time to a D-to-Q delay of a said D-type flip-flop in said register.

20. The method of claim 17, wherein step (b) includes providing a jitter clock comprising a digital mixer having first and second input ports coupled to receive respective first and second signals having respective first and second frequencies;

said digital mixer having an output port providing a phase signal of frequency equal to a frequency difference between said first and second frequencies.

21. The method of claim 17, wherein said jitter clock outputs a phase noise signal that violates a chosen one of set-up time margin and hold time margin for said flip-flops to cause said flip-flops to operate metastably.

22. A method for generating first and second channels of undeterministic data signals, the method including the following steps:

(a) providing a first plurality of N1 D-type flip-flops, each flip-flop including:
   a clock input port coupled to a common jitter clock signal;
   a delay input port coupled to receive a dedicated free running oscillator signal; and
   an output port;

(b) providing a second plurality of N2 D-type flip-flops, each flip-flop including:
  a clock input port coupled to a common jitter clock signal;
  a delay input port coupled to receive a dedicated free running oscillator signal; and
  an output port;

(c) providing a jitter clock, outputting a phase noise signal causing said flip-flops to operate metastably;

(d) providing N1 free-running oscillators, each oscillator oscillating at a frequency that is a prime number relative to a frequency of oscillation of each other of said oscillators, each oscillator having an output port coupled to a said delay input of one of said flip-flops comprising said first plurality of N1 D-type flip-flops;

(e) providing N2 free-running oscillators, each oscillator oscillating at a frequency that is a prime number relative to a frequency of oscillation of each other of said oscillators in said system, each oscillator having an output port coupled to a said delay input of one of said flip-flops comprising said second plurality of N2 D-type flip-flops;

(f) providing first exclusive-OR means for outputting a first channel of undeterministic data, wherein said first exclusive-OR means is coupled to receive an output signal from each said D-type flip-flop in said first plurality of N1 D-type flip-flops;

(g) providing second exclusive-OR means for outputting a second channel of undeterministic data, wherein said second exclusive-OR means is coupled to receive an output signal from each said D-type flip-flop in said second plurality of N2 D-type flip-flops;

(h) providing an M-bit shift register having an input port coupled to said output port of said first exclusive-OR means, having a clock port coupled to receive said jitter clock signal, and having an output port; and (i) providing an N-bit shift register having an input port coupled to said output port of said second exclusive-OR means, having a clock port coupled to receive said jitter clock signal, and having an output port;

wherein N1 and N2 are integers;

wherein M and N are numbers having a characteristic selected from the group consisting of (a) M and N are unequal, (b) M is even and N is odd, (c) the smaller of M and N exceeds 9, and (d) the difference between M and N exceeds 5;

wherein first and second channels of undeterministic data signal are present at said output port of said M-bit shift register and said N-bit shift register.

23. The method of claim 22, wherein:

at least one of step (h) and step (i) includes providing a said shift register having bit positions defined by a D-type flip-flop having a said clock port, a flip-flop D input port, and a Q output port;

wherein at least one of step (h) and step (i) includes providing a delay element coupled in series between adjacent bit positions in said shift register;

said delay element including a logic gate whose delay is substantially equal in time to a D-to-Q delay of a said D-type flip-flop in said register.

24. The method of claim 22, including further steps (j) providing an exclusive-OR tree coupled to receive as inputs said first and second channels of undeterministic data signal output by said M-bit shift register and said N-bit shift register said exclusive-OR tree providing a first and second intermediate output channels of data in response to said first and said second channel of undeterministic data signal from said output port of said first and said second exclusive-OR means, respectively;

(k) providing a first intermediate exclusive-OR gate coupled in series between said first exclusive-OR means and said M-bit shift register;

said first intermediate exclusive-OR gate having a first input port coupled to receive said first channel of undeterministic data from said output port of said first exclusive-OR means, having a second input port coupled to receive the second intermediate channel of data from said exclusive-OR tree, and having an output port coupled to said input of said M-bit shift register;

(n) providing a second intermediate exclusive-OR gate coupled in series between said second exclusive-OR means and said N-bit shift register;

said second intermediate exclusive-OR gate having a first input port coupled to receive said second channel of undeterministic data from said output port of said second exclusive-OR means, having a second input port coupled to receive the first intermediate channel of data from said exclusive-OR tree, and having an output port coupled to said input of said N-bit shift register;

wherein independent first and second channels of undeterministic data are output by the first and second intermediate exclusive-OR gates.

25. The method of claim 24, including the additional steps of:

(o) providing third and fourth exclusive-OR gates, each having a first input port coupled to said input port of said M-bit shift register, each having a second input port coupled to said input port of said N-bit shift register, and each having an output port;

(p) providing first and second output D-type flip-flops, each having a D-input port, an output port, and a system clock input port coupled to receive a common system clock signal that is asynchronous relative to said jitter clock signal;

said output port of the third exclusive-OR gate being coupled to said D-input port of said first output D-type flip-flop;

said output port of the fourth exclusive-OR gate being coupled to a D-input of said second output D-type flip-flop;

wherein first and second independent channels of undeterministic data having increased entropy are present at the output port of said first and said second output D-type flip-flop.

26. The method of claim 22, wherein step (c) includes providing a jitter clock comprising a digital mixer having first and second input ports coupled to receive respective first and second signals having respective first and second frequencies;

said digital mixer having an output port providing a phase signal of frequency equal to a frequency difference between said first and second frequencies.

27. The method of claim 22, wherein said jitter clock outputs a phase noise signal that violates a chosen one of set-up time margin and hold time margin for said flip-flops to cause said flip-flops to operate metastably.

28. The method of claim 22, wherein $N1 \geq N2$.

29. The method of claim 22, wherein at least one integer of said N1 and N2 has a characteristic selected from the group consisting of (i) said integer is even, and (ii) said integer is odd.

* * * * *